United States Patent Office 3,372,142
Patented Mar. 5, 1968

3,372,142
EPOXIDATION PROCESS
Douglas R. Smith, Freeport, Tex., assignor to the Dow Chemical Company, Midland, Mich., a corporation of Delaware
No Drawing. Filed Jan. 31, 1964, Ser. No. 341,782
5 Claims. (Cl. 260—47)

This invention relates to the epoxidation of halohydrins to produce 1,2-epoxides which are useful in the preparation of polymeric resins. More precisely, the invention concerns a process for the dehydrohalogenation of halohydrins by means of a solution of an alkali metal hydroxide and an alkali metal carbonate wherein undesirable side reactions are greatly reduced.

Epoxides used in the preparation of resins are commonly produced by dehydrohalogenating the corresponding halohydrin in the presence of a strong base such as sodium hydroxide under essentially anhydrous conditions, or under conditions of temperature and pressure such that the water is azeotropically removed. Epichlorohydrin and the glycidyl ethers and esters usually are obtained in this manner. The known epoxidation processes which use an alkali metal hydroxide solution usually require the removal of all components sensitive to aqueous alkali hydrolysis. Undesirable side reactions occur which result in low yields and loss of product. A part of the halohydrin may be hydrolyzed to a glycol rather than being dehydrohalogenated to an epoxide. Additionally, the ester linkages of the product may be split by the strong caustic. Mildly basic catalysts such as barium hydroxide, sodium borate and magnesium hydroxide have been used to minimize these undesirable side reactions. However, these mild catalysts are generally inefficient, slow-acting epoxidation agents. Another problem associated with the use of strong caustic is that salt crystallizes or precipitates from the solution as the reaction proceeds, resulting in a solid phase which requires a filtration step in recovering the product. Furthermore, when the components in the reaction contain vinyl groups their polymerization can be catalyzed by the presence of the solid phase.

In the preparation of the diglycidyl ether of bisphenol A, i.e. 2,2-bis(2,3-epoxypropoxyphenyl)propane, bisphenol A is reacted with epichlorohydrin in the presence of a basic catalyst. An excess of epichlorohydrin is used when a low molecular weight diepoxide is desired. A tertiary amine or a quaternary ammonium compound is sometimes used to promote the etherification and obtain a high proportion of the chlorohydrin ether having a single bisphenol group in the molecule. The excess epichlorohydrin must be removed from this intermediate product by distillation and an inert solvent added before strong caustic is added to epoxidize the chlorohydrin groups, otherwise the epichlorohydrin will be hydrolyzed to glycidol. This distillation is difficult due to the presence of the amine compound and is usually done with special equipment such as a falling film evaporator.

I have discovered an epoxidizing process which substantially overcomes the above problems. According to this invention, the epoxidization can be effected with a basic reagent comprising a solution of an alkali metal hydroxide and an alkali metal carbonate. This reagent effects the epoxidation without promoting the undesirable side reactions such as hydration of the epichlorohydrin or the splitting of oxirane and ester linkages. In addition the alkali metal halide formed does not precipitate to form a solid phase, but dissolves in the aqueous phase. This unique process may be used in the epoxidation of halohydrins as in the preparation of epichlorohydrin and the epoxidation of halohydrin ethers and esters.

The application of this process to the epoxidation of various compounds can be illustrated by reference to the following examples.

Example 1

A mixture containing one mole of bisphenol A and 12.5 moles of epichlorohydrin was heated to 65° C. for 25 hours with three grams of benzyl trimethyl ammonium chloride. The resulting product was a mixture of 1,3-glycerine dichlorohydrin and glycidyl(2 - hydroxy - 3-chloropropyl)isopropylidene bisphenol in epichlorohydrin. 842 grams of this product was combined with 520 grams of 5 N NaOH saturated with $Na_2CO_3$. The mixture was stirred at 26° C. for 90 minutes. At the end of that time the organic phase was neutralized with $CO_2$ to remove traces of the NaOH then washed twice with 200 ml. of water, filtered and distilled to 175° C. at 3–5 mm. Hg pressure. The finished resin analyzed 24.4 weight percent epoxide whereas the theoretical epoxide content of diglycidyl ether of bisphenol A containing a single bisphenol group is 25.1 percent, therefore, the product was 97 percent pure. The yield based on bisphenol A was 96.8 percent.

Example 2

A mixture of epichlorohydrin and acrylic acid was reacted over an anion exchange catalyst bed producing a mixture containing 342 grams of epichlorohydrin, 37.0 grams of glycerine dichlorohydrin, 38.9 grams of glycidyl acrylate and 17.4 grams of 2-hydroxy-3-chloropropyl acrylate. This product was epoxidized with 500 ml. of a reagent prepared by adding 50 ml. of 50 percent NaOH to 550 ml. of a $Na_2CO_3$ solution having a specific gravity of 1.266 at 26° C. The reagent was added at room temperature and maintained at that level with cooling for a period of 12 minutes with stirring. The organic layer which separated was found to contain 379 grams of epichlorohydrin, 1.53 grams of glycerine dichlorohydrin, 37.2 grams of glycidyl acrylate and 7.1 grams of 2-hydroxy-3-chloropropylacrylate. The epichlorohydrin was removed by distillation giving 95.5 percent recovery of glycidyl acrylate, having 96 percent purity.

Example 3

A reactor was charged with 300 ml. of epichlorohydrin, 291 grams of 94 percent arcylic acid, and 7.6 ml. of 65 percent benzyl trimethyl ammonium chloride solution in water. 1.4 grams of phenothiazine was added as a polymerization inhibitor. After maintaining the temperature of the mixture at 85° C. for 9.5 hours, 100 ml. of the mixture was found to contain 87.1 grams of epichlorohydrin, 8.7 grams of 1,3-glycerine dichlorohydrin, 8.64 grams of glycidyl acrylate, and 3.84 grams of 2-hydroxy-3-chloropropyl acrylate.

800 ml. of this product was charged to a reactor along with 191 ml. of a carbonate-caustic reagent. This reagent was prepared by mixing 800 grams of 50 percent NaOH with 1500 ml. of a $Na_2CO_3$ solution having a specific gravity of 1.167 at 26° C. The mixture in the reactor was stirred for 8 minutes while the temperature was maintained at about 27° C. At the end of that time 100 ml. of the organic phase contained 97.3 grams of epichlorohydrin, 0.57 gram of 1,3-glycerine dichlorohydrin, 8.45 grams of glycidyl acrylate and 1.14 grams of 2-hydroxy-3-chloropropyl acrylate.

Example 4

A reaction chamber containing 300 ml. of epichlorohydrin, 564 grams of phenol and 14 ml. of a 65 percent aqueous solution of benzyl trimethyl ammonium chloride was stored at room temperature (approximately 27° C.) for 13 days. At the end of that time 500 ml. of the mixture was charged to a reactor along with 630 ml. of a carbonate-caustic reagent containing 18.26 percent $Na_2CO_3$, 9.18 percent NaOH, and 72.5 percent water. The mixture was stirred at 25–30° C. for two hours. The organic layer recovered from the reactor was found to contain epichlorohydrin, phenyl glycidyl ether and a small amount of 2-hydroxy-3-chloropropyl ether of phenol. There was an 87 percent covnersion of the 2-hydroxy-3-chlorophenyl ether of phenol to phenyl glycidyl ether.

*Example 5*

A reactor was charged with 3000 ml. of epichlorohydrin, 564 grams of phenol and 200 ml. of a strong anion exchange resin which had been leached with acetone and air dried. The mixture was heated with stirring at 80–85° C. for 23 hours. At the end of that time 100 ml. of the product contained 9.93 grams of phenyl glycidyl ether, 8.91 grams of 2-hydroxy-3-chloropropyl ether of phenol, 8.5 grams of 1,3-glycerine dichlorohydrin and excess epichlorohydrin. 500 ml. of this mixture were charged to a reactor along with 630 ml. of caustic-carbonate reagent of the type used in Example 4. The mixture was stirred for 115 minutes with the temperature being maintained at about 26° C. Analysis of the organic phase revealed an 87 percent yield of phenyl glycidyl ether.

*Example 6*

In the manner of Example 1, a resin intermediate was formed by reacting 10 moles of epichlorohydrin with one mole of bisphenol A. A mixture of 800 grams of this intermediate and 475 grams of the $NaOH-Na_2CO_3$ solution used in Example 3 was stirred for 32 minutes at 42° C. The organic phase was then separated and washed twice with cold water, filtered and finally distilled at 4 mm. Hg pressure to 185° C. maximum pot temperature. The resin analyzed 24.45 percent epoxy and 0.4 percent chloride, indicating substantially complete conversion of the halohydrin groups to epoxide.

This reaction was also carried out with a $NaOH-Na_2CO_3$ solution which was saturated at 42° C. rather than at room temperature. The product resin had substantially the same epoxide and chloride composition as the above product.

*Example 7*

A resin prepared according to that of Example 6 using the $NaOH-Na_2CO_3$ reagent prepared at room temperature was produced by conducting the deyhdrohalogenation at 75° C. for 20 minutes. The product resin analyzed 24.02 percent peroxide and 0.66 percent chloride. This yield is a slight decrease from that obtained nearer room temperature, however, it is a great deal higher than is experienced with either NaOH or $Na_2CO_3$ alone and is suitable for most coating, potting and laminating uses.

*Example 8*

An epoxidation was carried out in a manner similar to that of Example 6 except that the reagent used was a $KOH-K_2CO_3$ solution having a specific gravity of 1.400 at 25° C. The reagent was prepared by saturating a 2.56 N solution of KOH with $K_2CO_3$ at 25° C. A mixture of 847 grams of the resin intermediate and 1400 grams of this reagent was stirred for 92 minutes at 25° C. The purified resin product analyzed 24.5 percent epoxide and 0.31 percent chloride.

In addition to the hydroxides and carbonates of sodium, those of other alkali metals such as lithium and potassium may be used in preparing epoxidation reagents. The preferred solutions are 1.5–5.5 normal caustic and saturated with the alkali metal carbonate. The caustic is saturated preferably at the temperature at which it is to be used. The epoxidation may be conducted at a temperature in the range 0.100° C. and preferably 20–75° C. with the time of reaction being dependent upon the temperature level employed and upon the reactivity of the specific reactants employed. From 3 to 120 minutes usually is sufficient for completion of the reaction. The quantity of the caustic-carbonate solution required is from a slight excess over the stoichiometric amount necessary to complete the dehydrohalogenation reaction to about twice the stoichiometric amount.

In the above examples using a quaternary ammonium compound to effect the etherification or esterification linkage prior to the epoxidation, the quaternary compound was not removed prior to the epoxidation step. When it is desirable to recover the quaternary ammonium compound for economic or other reasons it may be removed by a simple water wash prior to the epoxidation step. Removal is not necessary because it does not interfere with the principal reaction nor produce undesirable side reactions in the presence of the caustic-carbonate reagent as it sometimes does when the epoxidation is effected by caustic only. Also, excess epichlorohydrin remained in the epoxidation mixture in these examples with no significant loss thereof owing to glycidol formation. Neither was there any noticeable splitting or hydrolysis of the preformed ether and ester linkages during the epoxidation step.

This epoxidation process has particular utility in the preparation of epichlorohydrin from 1,3-glycerine dichlorohydrin, diglycidyl ether of bisphenol A from di(2-hydroxy-3-chloropropyl)ether of bisphenol A, phenyl glycidyl ether from the 2 - hydroxy - 3 - chloropropyl ether of phenol, glycidyl acrylate from 2-hydroxy-3-chloropropyl acrylate, monoglycidyl ether of bisphenol A from mono (2-hydroxy-3-chloropropyl)ether of bisphenol A, as well as glycidyl esters of other saturated or unsaturated carboxylic acids, glycidyl ethers of other phenols, and epoxides from the corresponding chlorohydrin compounds.

I claim:
1. The process of epoxidizing 2-hydroxy-3-chloropropyl acrylate in the presence of epichlorohydrin comprising contacting said acrylate with an aqueous sodium hydroxide solution substantially saturated with sodium carbonate, the concentration of said solution being in the range from 1.5 to 5.5 N with respect to said sodium hydroxide, and maintaining a reaction temperature in the range from 20 to 75° C. for about 3 to 20 minutes.

2. In a process of epoxidizing a mixture of chlorohydrins produced by the reaction of excess epichlorohydrin with a compound selected from the group consisting of carboxylic acids and phenols in the presence of a catalyst selected from the group consisting of quaternary ammonium compounds and anionic exchange resins, the improvement comprising contacting said mixture of chlorohydrins with an aqueous solution of an alkali metal hydroxide saturated with an alkali metal carbonate.

3. In a process according to claim 2 wherein said mixture of chlorohydrins is produced by reacting excess epichlorohydrin with 2,2-bis(4-hydroxphenyl)propane and said catalyst is benzyl trimethyl ammonium chloride.

4. In a process according to claim 2 wherein said mixture of chlorohydrins is epoxidized by contact with an aqueous solution of sodium hydroxide saturated with sodium carbonate, said solution being from about 1.5 to 5.5 N with respect to sodium hydroxide.

5. The process of epoxidizing a vicinal chlorohydrin compound by dehydrochlorinating said compound in the presence of an aqueous solution of between 1.5 and 5.5 N alkali metal hydroxide and substantially saturated with an alkali metal carbonate.

References Cited

UNITED STATES PATENTS

| | | | |
|---|---|---|---|
| 2,556,075 | 6/1951 | Erickson | 260—348.6 |
| 2,925,426 | 2/1960 | Schroeder. | |
| 2,943,096 | 6/1960 | Reinking | 260—348.6 |

WILLIAM H. SHORT, *Primary Examiner.*

T. D. KERWIN, *Assistant Examiner.*